United States Patent [19]

Jurva

[11] 3,970,478

[45] July 20, 1976

[54] VENTING OF ELECTROCHEMICAL CELL

[75] Inventor: Edsel O. Jurva, Brooklyn Center, Minn.

[73] Assignee: Medtronic, Inc., Minneapolis, Minn.

[22] Filed: Mar. 14, 1975

[21] Appl. No.: 558,418

[52] U.S. Cl. ............................. 136/133; 136/107; 136/135 R; 136/178
[51] Int. Cl.² ......................................... H01M 2/04
[58] Field of Search ........... 136/133, 177, 178, 135, 136/107

[56] References Cited
UNITED STATES PATENTS

| | | | |
|---|---|---|---|
| 2,595,963 | 5/1952 | Lewis et al. ........................ | 136/177 |
| 3,256,117 | 6/1966 | Howatt et al. ...................... | 136/178 |
| 3,802,923 | 4/1974 | Spanur .............................. | 136/178 |
| 3,861,964 | 1/1975 | Michalko ........................... | 136/177 |

Primary Examiner—John H. Mack
Assistant Examiner—C. F. LeFevour
Attorney, Agent, or Firm—Schroeder Siegfried Ryan and Vidas

[57] ABSTRACT

An electrochemical cell in which the sealing material between the electrodes of the cell is impervious to liquid and has limited permeability to hydrogen gas. The improvement in the cell construction is a shortened path around the sealing material to permit a discharge of a large accumulation of hydrogen gas abnormally generated in the cell to prevent a significant buildup of gas therein which might cause rupturing of the cell. The shortened path is affected by openings in the inner terminal member associated with the sealing material.

8 Claims, 2 Drawing Figures

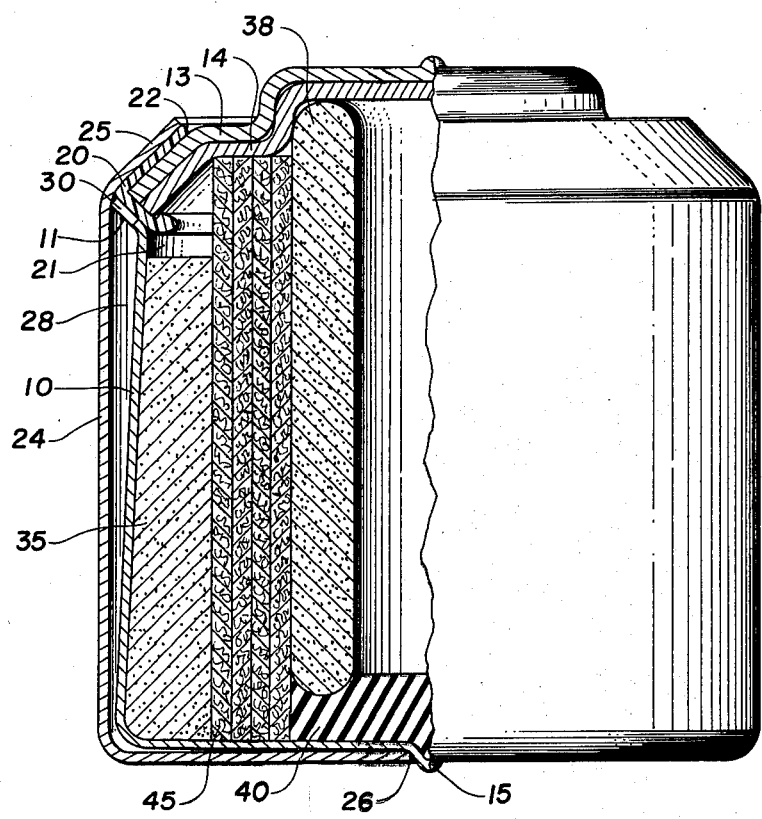
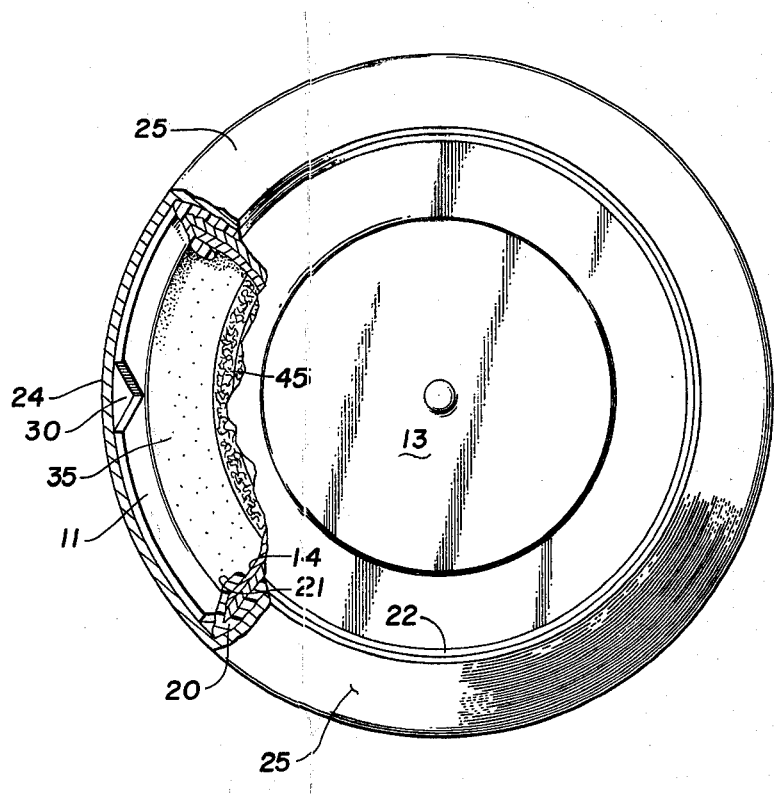

VENTING OF ELECTROCHEMICAL CELL

Our invention relates to electrochemical cells and more particularly to an improved electrochemical cell which includes a means for preventing a buildup of excess internal gas pressure within the cell.

Electrochemical cell constructions take a variety of forms. Where such cells are constructed to be sealed or liquid tight to prevent possibility of escape of electrolyte, they have also included the provision for venting the cell upon the presence of an excess of pressure within the cell to prevent the explosion or rupturing of the cell. However, such constructions are erratic in the release of a gas generated within the cell and operate only upon a predetermined maximum pressure buildup and the release of the gas and electrolyte takes place rapidly and instantaneously. Generally this is accomplished by deformation of part of the cell construction which returns to its normal configuration when the equilibrium pressure is obtained within the cell except where extremes in pressure are encountered. An example of such construction is shown in the patent to F. D. Williams, U.S. Pat. No. 2,712,565, dated July 5, 1955, and entitled ELECTROCHEMICAL CELL. When such cell constructions are used in connection with implantable medical devices, and they are associated with other equipment and encapsulated or where they serve merely as an encapsulated power source, the aspect of the design which permits the rapid expulsion of the gas upon pressure buildup presents an undesirable situation with respect to the encapsulation. Normally, the encapsulant or at least a portion of the construction associated with the cells, is made of gas permeable material so as to be able to absorb and/or release gradually the gas generated from the cell. However, the construction is such that it is unable to absorb or release the extreme rapid discharge or venting of gas from the cell. This creates an excessive buildup of pressure within the device and subjects the same to cracking or rupture.

In the present invention, an improved cell construction is provided in which the cell is suitably sealed to prevent the escape of electrolyte and the sealant is made of a material which is permeable to hydrogen gas generated within the cell. The design of the electrode terminals and the cell construction itself is such as to provide a leakage path for the hydrogen generated within the cell with a relatively low pressure buildup to displace the terminals relative to the seal and release the hydrogen gas from the cell at a lower pressure level so as to create no excessive gas pressure within the cell to prevent significant or permanent deformation and a large surge of gas release to protect the implantable medical device with which it is associated. Thus, as will be taught in the present invention, the cup design or a terminal of the cell is modified to provide a shortened path for hydrogen gas around the sealant material thereby preventing a significant buildup of pressure within the cell.

It is therefore an object of this invention to provide an improved cell construction having good venting characteristics to gas generated therein.

Another object of this invention is to provide an improved electrochemical cell construction which retains its characteristics as a sealed device to prevent the escape of electrolyte and because of the venting characteristics, it is particularly suitable for use in an implantable electrical device.

These and other objects of the invention will become apparent from the reading of the attached description together with the drawings wherein:

FIG. 1 is a view of an electrochemical cell in vertical partial section embodying our invention; and, FIG. 2 is a plan view of the cell of FIG. 1 with parts broken away.

Referring to the drawings of FIGS. 1 and 2, reference numeral 10 denotes the inner casing or can of steel which is generally cup shaped in form having straight or inwardly sloping walls and an outwardly flared lip 11 at the open upper edge of the same. The buttom of the cup shaped casing has a dimple or depression 15 at the center of the same, for purposes to be later noted. The cup shaped member 10 forms one terminal of the cell with the opposite terminal being defined by a pair of disc shaped members 13 and 14 which are meant to nest together at the center of the same with the outer edges being disposed from one another to provide a spacing between the disc shaped terminal members at the outer edge of the same. These members or metal plates are made of a material to provide a good and permanent electrical contact with each other and to circuit components attached to the exposed upper plate 13. Positioned between these electrode terminal members 10, 13, and 14 is a annular sealing member 20 which is preferably made of a synthetic elastomer, such as neoprene. The sealing member includes a body portion 21 which is positioned between the flared lip 11 of the can or terminal 10 and the outer edges of the disc shaped terminal members 13 and 14. Positioned over the inner cup shaped terminal member is an outer can or cover member 24 which encircles the inner can and has straight outwardly sloped side walls with an inwardly flared upper lip 25. The can has an opening in the center of the bottom, as indicated at 26, which cooperates with the dimple 15 or depression in the bottom of the inner can to perform a second valving action, as will be hereinafter defined. The lip 25 bears against the sleeve portion 22 of the sealing member 20 urging the same against the disc shaped members 13 and 14 and clamping the disc shaped members 13 and 14 with the body portion 21 of the sealing member to the inner can 10 to provide the sealed relationship between the terminal members. Such a construction is similar to the prior art as set forth in the Williams patent referred to above with the sealing member providing a liquid-tight seal between the disc shaped members preventing the escape of electrolyte, (to be hereinafter identified) from the cell. The spacing between the disc shaped members 13 and 14 at the edges thereof provides a trap for any electrolyte that might escape beyond the inner disc shaped member 14 and the spacing 28 between the inner terminals can 10 and the outer cover member 24 provides a passage for electrolyte and/or hydrogen gas generated within the cell.

In the present invention, as specifically set forth in FIG. 2, the lip 11 has a series of V-shaped notches 30 distributed about the periphery of the same. The interior of the cell may take varying forms and the cathode electrode will preferably be a sleeve type member 35 made of a mixture of mercuric oxide with graphite which is press fitted within the inner surface of the terminal 10. The opposite electrode or anode is in the form of a cylindrical cylinder or sleeve 38 which will preferably be made of a amalgamated zinc powder which is positioned concentric with the disc shaped electrode 14. Suitable insulator and spacer member 40 is positioned beneath the same to separate the anode from the terminal 10, the spacer being a synthetic elastomer, such as neoprene. Positioned between the anode and cathode is the electrolyte which is preferably formed in the cylinder 45 and in the form of a plurality of layers of a paper-like material saturated with the electrolyte which may basically be an alkaline metal hydroxide.

The sealing member 20 which is made preferably of a neoprene will provide a sealed and liquid-tight insulating boundary between the terminals of the cell. The neoprene is permeable to hydrogen gas which may be generated within the cell due to normal cell operation. However, momentary shorting of the cell will generate significant amounts of gas to significantly increase pressure therein which cannot be permeated through the neoprene seal in a period of time to prevent the significant increase in gas pressure therein. Thus, the gas generation will increase internal pressure within the cell to slightly displace the terminal parts. Distinguishing over the prior construction, the notches 30 in the lip of the inner terminal shorten the path of gas flow around the neoprene or body of the sealer member so as not to permit a buildup of gas within the cell. Thus as gas is generated, it will be discharged around the neoprene seal and through the notches to enter the space 28 between the inner electrode terminal and the outer protective can 24 wherein it will follow the outer can to the valve type opening formed by the depression 15 and aperture 26 respectively to be released from the cell. The shortened path permits the cell to quickly reach and maintain an equilibrium pressure within the cell and prevents a severe or sharp discharge of gas therefrom or possibly fracturing of the seal, making it compatable with an implantable device wherein the cell would normally be encapsulated by gas impervious material. The gradual release also enables the construction of an encapsulated device to absorb the release of gas without a significant buildup of internal pressure within the device to damage the same.

While I have specified certain materials to be incorporated within the cells, it would be recognized that variations may be made thereto within the scope of the present invention.

What I claim is:

1. An electrochemical cell comprising, an inner cup shaped electrode terminal having side walls and an upper lip, a disc shaped electrode terminal having edges, sealing means made of a liquid impervious material positioned in part between the cup shaped terminal and the disc shaped terminal separating the same in an insulating manner from one another, said sealing means including a body portion and a sleeve portion with the body portion positioned between the upper lip of the cup shaped terminal and the edges of the disc shaped terminal, an outer cup shaped cover member having a lip and side walls, said outer cup shaped cover member being fitted over the inner cup shaped electrode terminal and with the lip thereof bearing against the sleeve portion of the sealing member and clamping the disc shaped terminal and the inner cup shaped terminal together in an assembled and sealed relationship, and a series of openings in said inner cup shaped electrode terminal adjacent the body portion of the sealing member to provide a shortened path for hydrogen gas generated by the cell under severe load conditions of the cell by displacement of the sealing member from the inner cup shaped electrode terminal and permitting passage of the gas around the sealing member from the interior of the cell with the displacement of the sealing member by said gas.

2. The electrochemical cell of claim 1 in which the disc shaped electrode terminal includes a pair of disc shaped members nested together in a contacted relationship at the center thereof with the edges of the members bearing against the body portion of the sealing member.

3. The electrochemical cell of claim 1 in which the openings in the inner cup shaped electrode terminal are V-shaped notches in the flared lip thereof.

4. The electrochemical cell of claim 1 in which the outer cup shaped cover member has an aperture in the bottom thereof remote from the upper flared lip cooperating with the inner cup shaped electrode terminal to define a passage for hydrogen gas vented from the cell.

5. The electrochemical cell of claim 2 in which the body portion of the sealing member provides a sealing surface between the separated edges of the pair of disc shaped terminal members.

6. The electrochemical cell of claim 3 in which the sleeve portion of the sealing member forms a liquid-tight seal between the outer cover member and the disc shaped electrode terminal members and in which the spacing at the edges therebetween provides a trap for electrolyte leakage.

7. The electrochemical cell of claim 5 in which the inner cup shaped electrode terminal has a depression concentric with the opening in the outer cover member and cooperating therewith to provide a valved outlet for hydrogen gas from the cell.

8. An electrochemical cell comprising, an inner cup shaped electrode terminal having inwardly sloped walls and an outwardly flared upper lip, a disc shaped electrode terminal having an edge, an annular sealing member being made of a liquid impervious material positioned between the inner cup shaped terminal and the disc shaped terminal separating the same in an insulating manner from one another, said sealing member having a body portion and a sleeve portion with the body portion positioned between the flared upper lip of the inner cup shaped terminal and the edge of the disc shaped terminal, an outer cup shaped cover member having an upper, inwardly extending flared lip and outwardly sloped side walls, said outer cup shaped cover member being fitted over the inner cup shaped electrode terminal with the inwardly flared lip thereof bearing against the sleeve portion of the sealing member and clamping the disc shaped terminal and the inner cup shaped terminal together in an assembled and sealed relationship, and openings in the flared lip of the inner cup shaped terminal to provide a shortened path for the flow of hydrogen gas around the sealing member from the interior of the cell upon displacement of the sealing member from the inner terminal under the presence of a predetermined gas pressure within the cell and permitting gas flow to the spacing between the inner cup shaped terminal and the outer cup shaped cover member defined by the oppositely sloped walls thereof, said cell containing electrode materials common only to the respective terminal with an electrolyte material positioned therebetween.

\* \* \* \* \*